G. W. KAUSER.
STEREOPTIGRAPH.
APPLICATION FILED AUG. 3, 1910.
1,064,838.
Patented June 17, 1913.
5 SHEETS—SHEET 2.
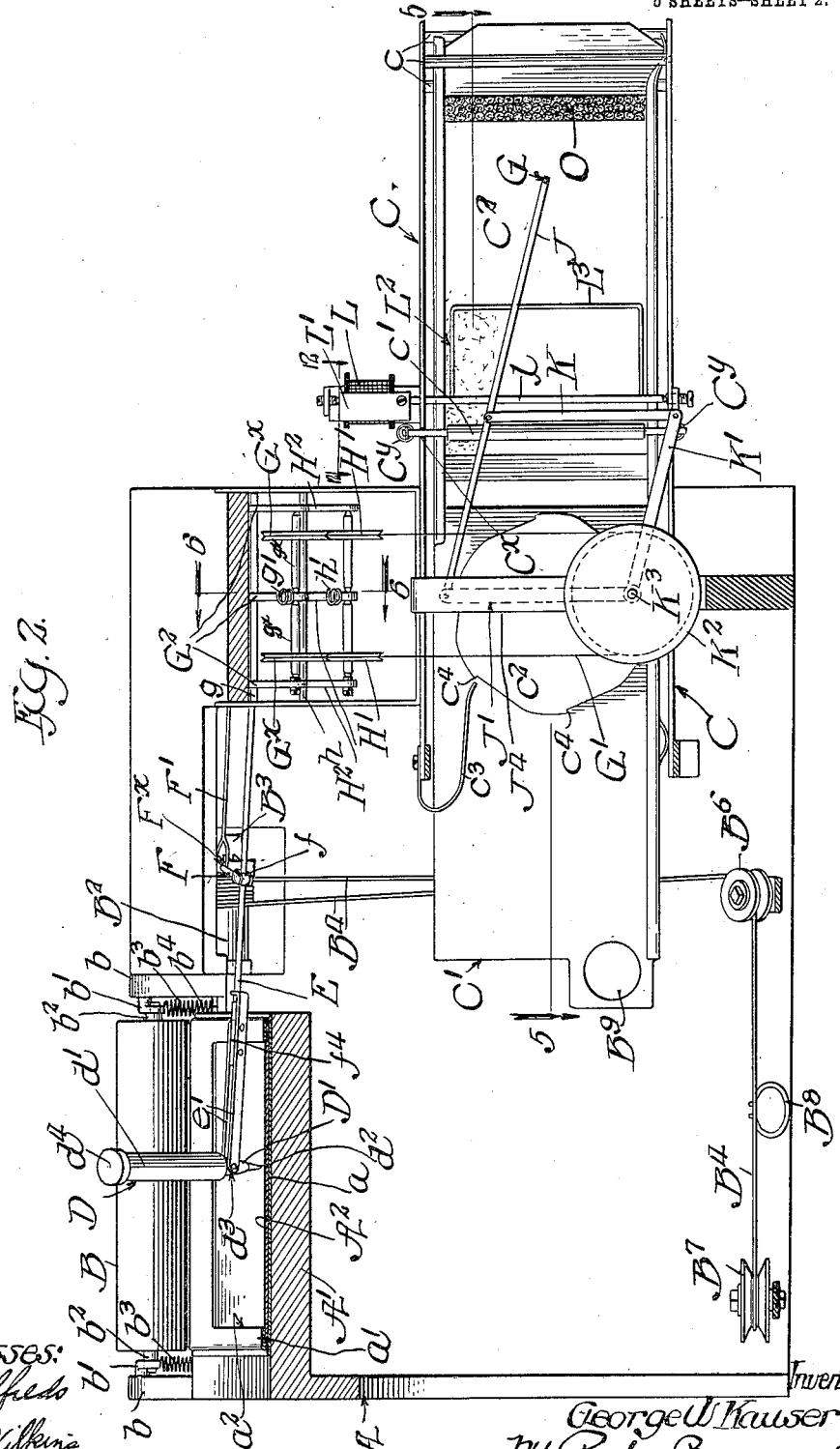

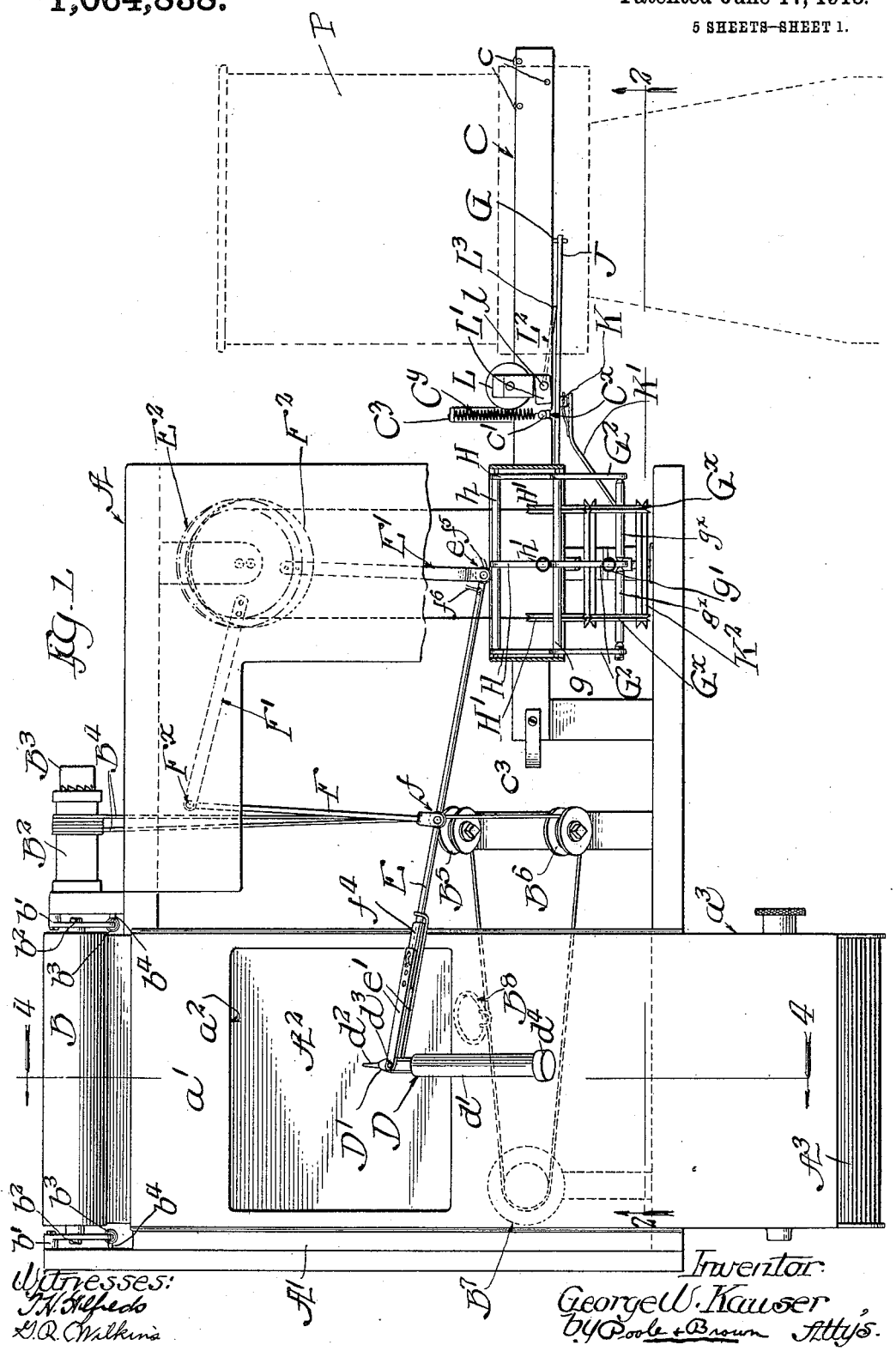

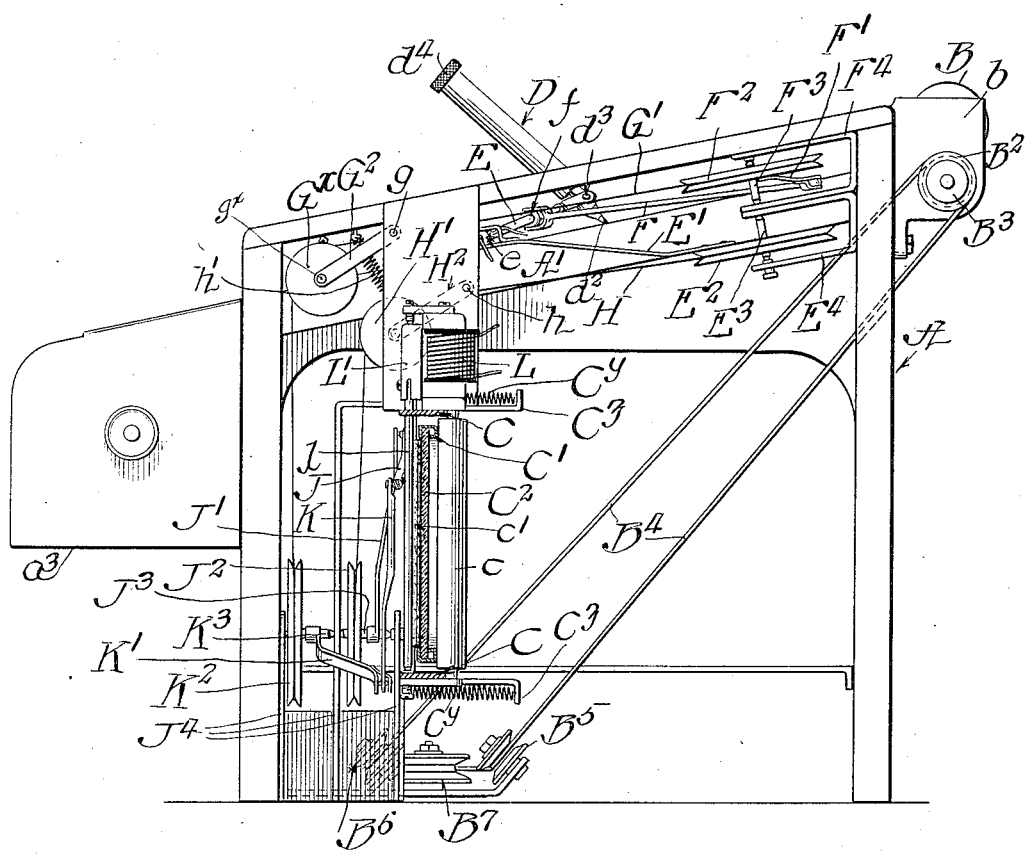

G. W. KAUSER.
STEREOPTIGRAPH.
APPLICATION FILED AUG. 3, 1910.
1,064,838.
Patented June 17, 1913.
5 SHEETS—SHEET 4.
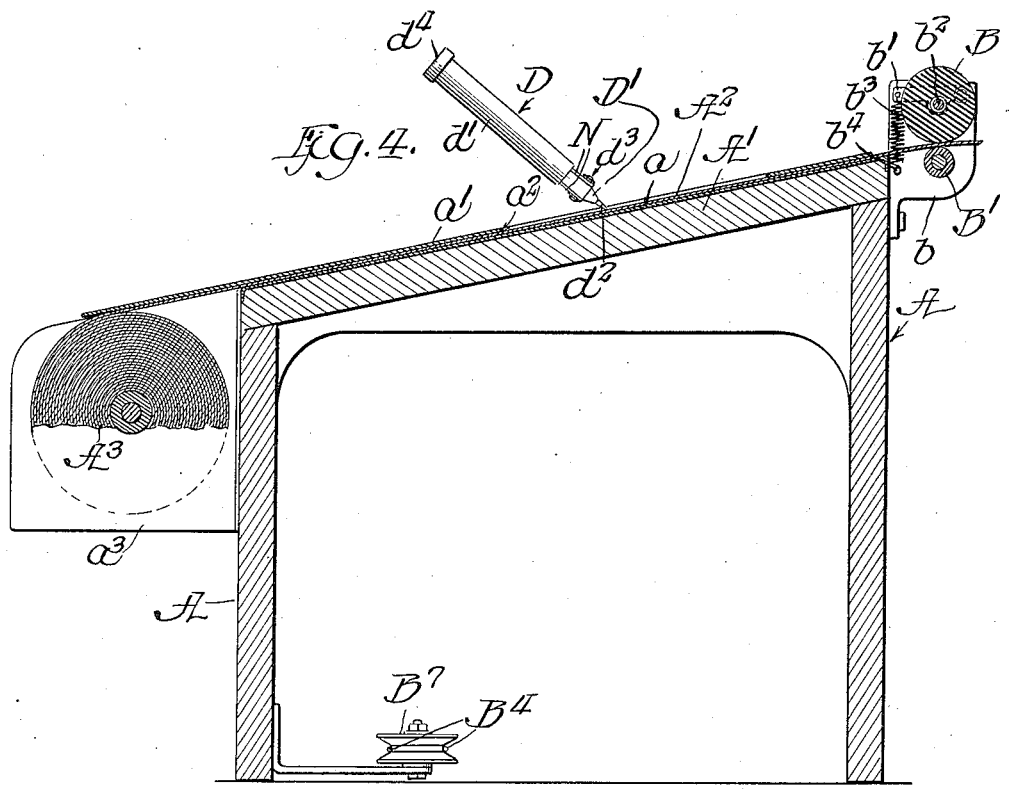
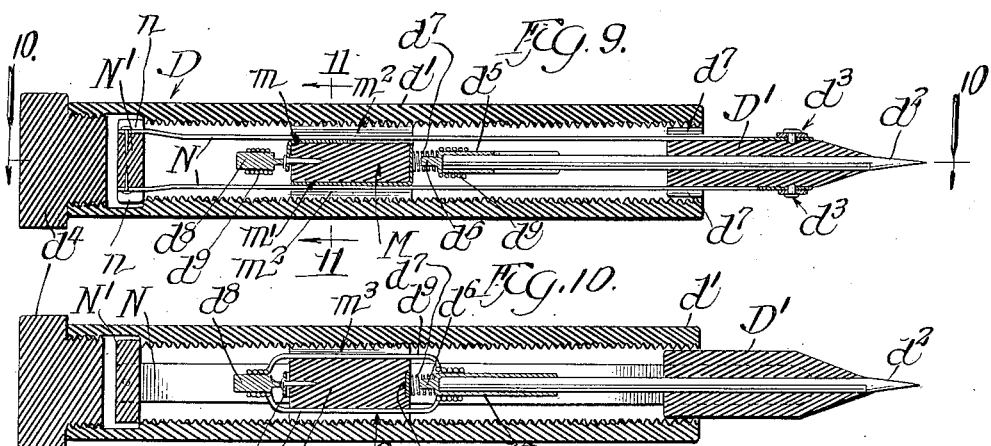
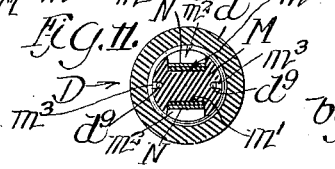
Witnesses:
T. H. Alfeds
L. Q. C. Wilkins
Inventor
George W. Kauser
by Poole + Brown Attys

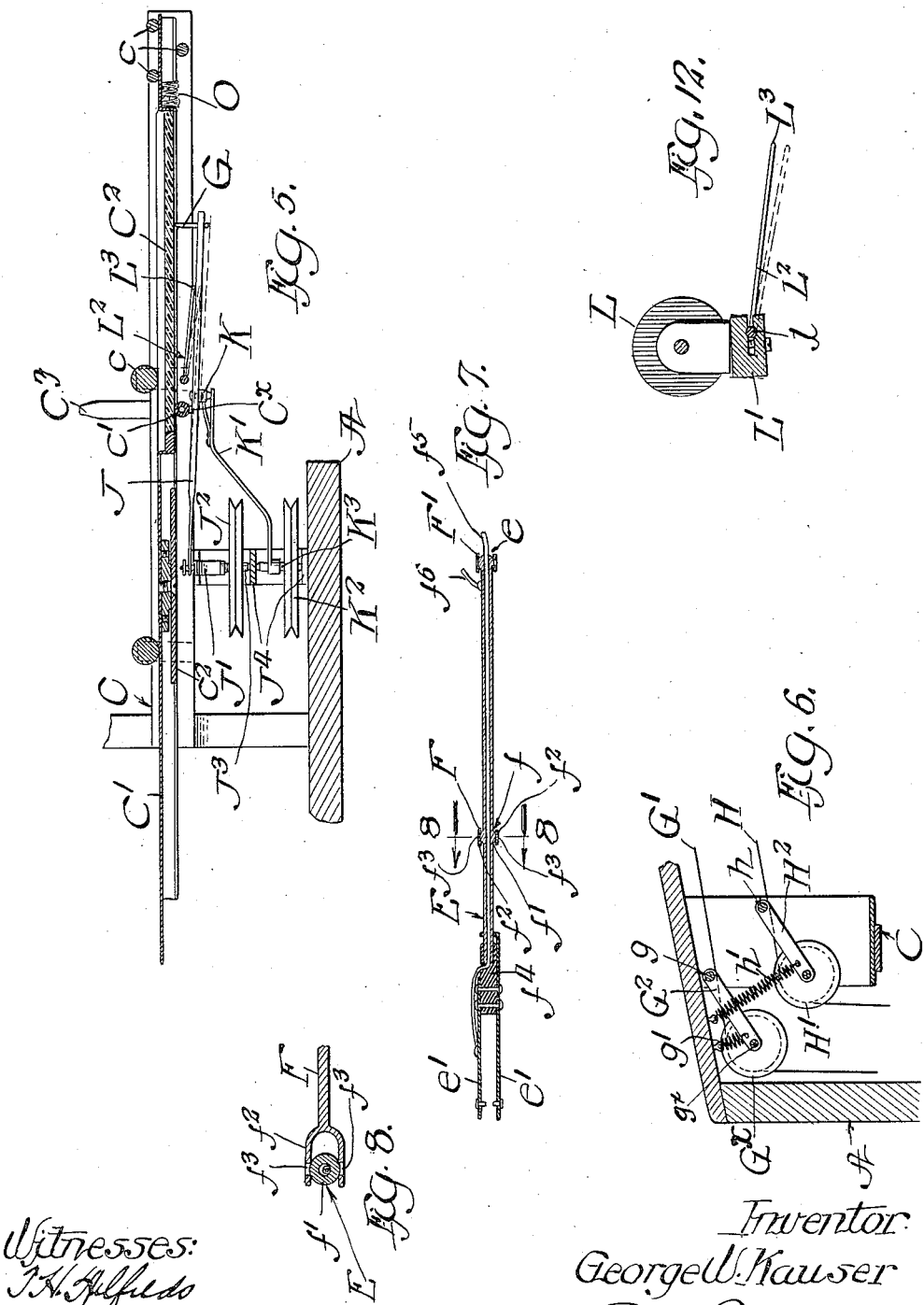

UNITED STATES PATENT OFFICE.

GEORGE W. KAUSER, OF CHICAGO, ILLINOIS.

STEREOPTIGRAPH.

1,064,838.  Specification of Letters Patent.  Patented June 17, 1913.

Application filed August 3, 1910. Serial No. 575,305.

*To all whom it may concern:*

Be it known that I, GEORGE W. KAUSER, a citizen of the United States, and a resident of Chicago, in the county of Cook and State of Illinois, have invented certain new and useful Improvements in Stereoptigraphs; and I do hereby declare that the following is a full, clear, and exact description thereof, reference being had to the accompanying drawings, and to the letters of reference marked thereon, which form a part of this specification.

This invention relates to an improvement in stereoptigraphs and the primary object of the invention is to provide a machine for producing upon a slide of glass covered with ink or other opaque substance of like character pen or pencil effects in the form of pictures or writings. The pictures or writings are exact reproductions of writings or pictures which are produced originally, or are traced from previously made originals, by the operator on a platen or tablet which may be located near or at a distance from the stereopticon, depending upon the way in which the apparatus is to be used. The writing or picture produced on the slide is thrown upon a screen in the usual way while being produced.

In that embodiment of my invention which is illustrated herein, the platen or tablet upon which the original is drawn or traced is located adjacent the receiving slide upon which the copy is reproduced; and this embodiment includes in its preferred form a plate of transparent material, such as glass, mounted in a suitable guide which is adapted to be inserted in the stereopticon; mechanism for withdrawing the plate from the axis of the stereopticon and for re-inking it and for returning it to its first position; a receiving stylus which is adapted to reproduce on the receiving plate of the stereoptigraph matter which is drawn or traced at another point; a sending platen or tablet which is adapted to support the paper upon which the original writing is made or to support the previously made picture or writing to be traced; a sending or tracing pen or pencil which is adapted to produce the original writing drawing or picture or to trace over the previously made writing, drawing or picture which is to be reproduced by the receiving stylus on the glass slide of the stereoptigraph; and mechanical connections between the tracing or sending pen and the receiving stylus, by means of which the movement of the point of the sending pen in the plane of its platen or tablet will be absolutely reproduced by a proportional movement in the same direction of the point of the receiving stylus, in the plane of the glass slide, but in reversed order, so that the writing, drawing or picture may appear upright upon the screen.

While the apparatus described and illustrated herein is intended primarily for use in connection with a stereopticon and from this use derives its name, it will be apparent as I proceed with my description that it may be used in other connections and for other purposes and may be applied to the mechanical reproductions of drawings, writings or pictures produced at some distance from the receiving pen or stylus.

The invention consists of the matters hereinafter described and more particularly pointed out in the appended claims.

In the drawings:—Figure 1 is a top plan view of my improved stereoptigraph. Fig. 2 is a longitudinal section through Fig. 1 on the line 2—2 thereof. Fig. 3 is an end elevation of the stereoptigraph showing the glass slide and guide frame in cross section. Fig. 4 is a vertical section through Fig. 1 on the line 4—4 thereof. Fig. 5 is a horizontal section through Fig. 2 on the line 5—5 thereof. Fig. 6 is a partial vertical section through Fig. 2 on the line 6—6 thereof. Fig. 7 is a detail longitudinal sectional view through the carrying arm of the sending pen or pencil. Fig. 8 is a cross-section through Fig. 7 on the line 8—8 thereof. Fig. 9 is a longitudinal section on a modified scale through the sending pen. Fig. 10 is a longitudinal section through Fig. 9 on the line 10—10 thereof. Fig. 11 is a cross-section through Fig. 9 on the line 11—11 thereof. Fig. 12 is a partial horizontal section through Fig. 2 on the line 12—12 thereof.

The apparatus, as illustrated in the drawings, is supported on a frame A provided with an inclined top $A^1$ which supports the sending platen or tablet in a position convenient for writing or tracing upon.

$a$ indicates the platen which is arranged near one end of the inclined top and is preferably covered by a plate $a^1$ cut out to form a rectangular opening $a^2$, the boundaries of which determine the limits of the picture or writing that is to be reproduced. Upon the platen is located a strip of paper $A^2$ which is preferably fed from a roll $A^3$ rotatably mounted in a box $a^3$ which is secured in any convenient manner to the front of the frame A.

B, $B^1$ indicate tension rolls located at the top of the platen and supported by standards $b, b$ between which the paper is fed and by means of which it may be withdrawn from the roll $A^3$. As illustrated, the lower roll $B^1$ is journaled in the standards $b, b$ while the upper roll B is journaled by means of trunnions $b^2, b^2$ in vertically swinging arms $b^1, b^1$ pivoted to said standards. Tension springs $b^3$, connected at their upper ends to said arms $b^1$ and at their lower ends to the standards hold the upper roll yieldingly against the lower roll.

The glass slide upon which the picture or writing is to be reproduced is slidably supported in a guide frame comprising upper and lower horizontal bars C and front and rear vertical rolls $c$ between which is located in a vertical plane the frame in which said glass is mounted. Said guide frame is located near the front of the main frame and projects from one end thereof. The horizontal bars C, C are secured in any convenient manner to the main frame.

$C^1$ is the slide frame and $C^2$ the slide, being in this instance a glass plate carried near the outer end of its frame. Said glass slide is covered with a thin coating of ink or other opaque substance to provide a non-transparent surface upon which the receiving stylus reproduces the writing or picture made by the sending pen or tracer by removing portions of said opaque matter.

Mechanism for inking the glass slide $C^2$ is provided as follows: $C^1$ is a vertically arranged inking roll which is rotatably mounted in the horizontal bars C near the inner end of the glass $C^2$. Said inking roll is so arranged that when the slide is withdrawn to the left end of its guide frame it will contact with the glass slide and impart a fresh coating of ink thereto. It is preferably journaled in notches $C^x$ in the front edges of the bars C, C and is held therein by tension springs $C^y$ connected to brackets $C^z$ to hold said roll in yielding contact with said glass slide when the same is passed under it. To the left of the inking roll is located a disk $c^2$ to the face of which is applied a quantity of thick ink. The disk $c^2$ is rotatably mounted on the slide frame $C^1$ in a plane with the inked face of the glass slide. It is adapted to be intermittently rotated through a small angle by a pawl $c^3$ secured to the upper bar C so as to engage ratchet teeth $C^4$ on the edge of the disk $c^2$ when the slide frame is moved to withdraw the slide from the stereopticon. After the slide frame $C^1$ has been withdrawn to the left to pass the glass slide $C^2$ under the inking roll $c^1$ it is then preferably pushed to the right beyond the limits of the bars C of the guide frame to bring the disk $c^2$ under and in engagement with the inking roll $c^1$. The ink roll is thus covered with a fresh supply of ink. The plate is then withdrawn to bring the glass plate to its normal position in the stereopticon. By this arrangement the disk $c^2$ is shifted through a small angle each time the slide frame is withdrawn to ink the glass slide, thus bringing the fresh supply of ink on the disk into a new position for the next contact of the disk with the inking roll.

D indicates the sending or tracing pen. Said sending pen comprises a holder $d^1$ and a writing member or pencil $d^2$. Said pen is pivotally connected at $d^3$ to a carrying arm E. F indicates a second carrying arm connected to the first at $f$ by a ball and socket joint, seen in detail in Fig. 8. Said ball and socket joint embraces a ball $f^1$ rigidly secured to the arm E and a forked extension $f^2$ of the arm F provided with socket openings $f^3$ in which the ball has bearing.

$E^1$, $F^1$ are secondary supporting arms which are connected, respectively, to the primary supporting arms E, F by a ball and socket joint similar to that above described as indicated at $e$ and $F^x$.

$E^2$, $F^2$ indicate rotary members to which the secondary arms $E^1$, $F^1$ are respectively secured. The rotary members are in the form of pulleys provided with axles $E^3$, $F^3$ which are journaled in brackets $E^4$, $F^4$ bolted to the main frame. The axles $E^3$, $F^3$ are preferably arranged with their axes in the same line, and the pulleys $E^2$, $F^2$ are located in planes parallel to the plane of the platen, so that the secondary arms $E^1$, $F^1$ will swing in planes parallel to the plane of said platen. The axles are provided with point bearings in the brackets $E^4$, $F^4$ to reduce friction. It is apparent that by this construction any movement of the point of the pencil $d^2$ in any direction in the plane of the platen will be resolved into two components, one in the direction of the length of the arm E and one in the direction of the length of the arm F, and that these components will produce a proportional angular movement of the secondary arms $E^1$, $F^1$ which will be communicated to the pulleys $E^2$, $F^2$.

G indicates the stylus or receiving pen which is arranged to move with its point in contact with the glass slide $C^2$ thereby tracing on the opaque, ink-covered surface thereof a transparent line caused by the removal of the ink in the path of its travel. Said stylus is secured to the end of a carrying arm J which is pivotally connected to a second carrying arm K. Each of the carrying arms J, K is pivotally connected at its ends respectively to secondary carrying arms $J^1$, K¹, each of which is rigidly connected to swing with rotary members J², K² mounted by means of suitable axles J³, K³, in standards J⁴ secured to the main frame. Said rotary members J², K² are in the forms of pulleys preferably having their axes of rotation in line with each other and arranged in planes parallel to the plane of the glass C². In the example illustrated herein the arms J¹ and K¹ are connected directly with the axles J³, K³ respectively.

The pulley F² is connected to the pulley K² by means of a wire belt G¹. Intermediate the pulleys F² and K² are located a pair of tension pulleys G$^x$, G$^x$ about which the parallel sections of the belt G¹ pass. Said pulleys G$^x$, G$^x$ are mounted on axles $g^x$ $g^x$ which are journaled in arms G², G². Said arms are secured to a shaft $g$ journaled in the frame. A tension spring $g^1$ connects the free end of one of said arms G² to the frame. A similar pair of tension pulleys H¹, H¹, mounted in the same way as indicated in the drawings, are arranged intermediate the pulley E² and the pulley J².

The pulleys E², F², J² and K² are all of the same diameter so that by the construction described any angular movement of the secondary arms E¹, F¹ imparts an equal angular movement to the corresponding secondary arms J¹, K¹. The angular movement of the secondary arms J¹, K¹ communicates a movement to the primary arms J, K in the direction of their length at any instant which produces a resultant movement of the receiving pen G in a direction relatively the same as that of the sending pen $d^2$, the length of the path of said movement of the receiving pen being proportional to the length of the path of the sending pen. Whether the movement of said receiving pen be in the same or reversed direction relative to that of the sending pen will depend upon whether the parallelograms formed by their respective primary and secondary arms are turned in the same direction or in opposite directions. In the example illustrated, the movements of the receiving pen are the reverse of that of the sending pen, as it is necessary to have the picture or writing on the slide upside down in order to throw it right side up on the screen. The ratio of the dimensions of the picture or writing reproduced on the glass slide to that of the picture or writing made or traced on the sending platen will be as the ratio of the lengths of the secondary arms of the receiving pen to the lengths of the secondary arms of the sending pen.

Means are provided for raising the receiving pen D from the glass slide when the sending pen is raised from its platen as follows: A small electromagnet L is mounted upon the upper bar C of the guide frame. Said magnet is provided with an armature L¹ which is rigidly secured to a vertical rod $l$ (see Figs. 1, 2 and 12) which is rotatably mounted in the upper and lower bars C, C between the glass slide frame C¹ and the carrying arm J of the receiving pen. L² is a rectangular U-shaped wire frame secured at its ends to the rod $l$ and having a vertical member L³ which normally rests in engagement with the underside of the carrying arm J. Said arm J is made of spring metal so that when the electromagnet L is energized and the hinged armature L¹ caused to swing toward said magnet, the member L³ of the U-shaped frame L² will lift the arm J away from the glass slide C², thus raising the receiving pen G from said slide. When said magnet is deënergized the spring tension of the arm J will bring the receiving pen G back into contact with the glass slide. Mechanism is provided in the sending pen D for making and breaking the circuit which energizes said magnet L when said pencil or pen is respectively lifted from its platen and brought into contact therewith. The holder $d^1$ consists of a cylindrical barrel closed by a cap $d^4$ which is screwed into its upper end. The cylindrical barrel $d^1$ is internally screw-threaded to receive a screw-threaded cylindrical block M. Said block is of an insulating material and is provided with longitudinal diametrically opposed slots $m^2$ on its cylindrical surface. Extending through said slots $m^2$, $m^2$ are parallel, diametrically opposed contact bars N which are connected at their upper ends to a disk N¹ of insulating material provided with notches $n$ on its edges to receive the ends of said contact bars. Said disk is rotatably mounted at the upper end of the barrel. The opposite ends of said contact bars are rigidly secured to a pencil supporting member D¹ of insulating material which is bored out longitudinally to receive a lead pencil $d^2$, and which is rotatably mounted in the lower end of the barrel $d^1$. In the bottom of the longitudinal slots $m^2$ in the block M are located brushes $m$, $m^1$ which are in the form of flat plates, the one $m$ having sliding contact with one of the contact bars N and the other, $m^1$, having sliding contact with the opposite contact bar N. The end of the bar $m$ is bent across the top of the block M while the end of the bar $m^1$ is bent across the bottom of said block. $d^8$ indicates a contact which is adapted to engage the upper bent end of the brush $m$. The contact member $d^8$ is supported at the upper ends of laterally disposed wires $d^9$, $d^9$ located in longitudinal grooves $m^3$, $m^3$ formed in the cylindric surface of the block M intermediate the channels $m^2$, $m^2$. Said wires project at their lower ends below said block M and are there connected to a sleeve $d^5$ which is closed at its upper end and receives the upper end of the pencil $d^2$. Said wires $d^9$ are preferably coiled about the contact member $d^8$ and the upper end of the sleeve $d^5$ and then soldered thereon in order to make a good electric connection. The upper closed end of the sleeve $d^5$ is provided with a projecting stud $d^6$ which supports a helical spring $d^7$ which bears between the upper closed end of said sleeve and the bent end of the brush $m^1$. Said spring normally holds the sleeve $d^5$ in its lower position which, through the wires $d^9$, holds the contact member $d^8$ in engagement with the upper bent edge of the brush $m$. This is the position of the parts when the pencil is raised from the platen. When the pencil is brought into engagement with the platen it forces the sleeve $d^5$ upward and with it the wires $d^9$ which raise the contact $d^8$ from its engagements with the brush $m$ and thus breaks the circuit. When the parts are in normal position, the circuit is from the contact bar N to the brush $m$, to the contact $d^8$, the wires $d^9$, to the sleeve $d^5$, through the helical spring $d^7$, to the brush $m^1$ and thence to the second contact bar N, diametrically opposite the first one mentioned. When the pencil $d^2$ is brought into contact with the plate or the paper thereon, the circuit is broken and the stud $d^6$ comes to bear against the block M through the bent end of the brush $m^1$, thereby giving a solid bearing to the upper end of the pencil lead $d^2$. By rotating the pencil supporting member $D^1$, the block M is rotated, thus causing said block to move up or down by means of its threaded connection with the barrel $d^1$, thereby feeding the pencil lead up or down, as desired. The carrying arm E is connected to the holder D by means of parallel, laterally separated contact bars $e^1$, $e^1$, which are pivotally connected to the pencil holding member $D^1$ in engagement with the contact bars N located in the pencil holder. The carrying arm E is in the form of a hollow tube which is connected to the contact bars $e^1$ through the medium of an insulating block $f^4$. One of said contacts $e^1$ projects beyond said insulating block and makes electric connection with the outer surface of the arm E (see Fig. 7), which thus forms part of the circuit. An insulated wire $f^5$ passes through the hollow tube constituting the carrying arm E and is led through the insulating block $f^4$ to connect with the other contact $e^1$. The outer surface of the arm E is connected to a wire $f^6$ which, together with the wire $f^5$, leads to the electromagnet L. Said wires are supported in any convenient manner so as not to interfere with the flexibility of the connections of the primary and secondary carrying arms. From this description it will be apparent that when the pencil lead $d^2$ is in contact with its plate, as when writing or tracing thereon, the contact member $d^8$ will be raised from the brush $m$ and the circuit supplying the magnet will be open, so that the receiving pen or stylus G will remain in contact with the glass slide. When said pencil is lifted from its platen, the contact member $d^8$ will descend and engage the brush $m$, thereby closing the circuit and energizing the magnet, which will swing the armature $L^1$ on its hinge, thereby, through the U-shaped frame $L^2$, raising the stylus carrying arm J, and lifting the stylus from the glass slide.

Any suitable mechanism may be used to feed the paper over the platen $a$, from the paper roll $A^3$, but in the form of my improved stereoptigraph illustrated herein, I provide a simple mechanism by means of which the paper may be fed from the roll to bring a fresh sheet under the opening $a^2$ in the plate $a^1$ by the same movement of the hand which withdraws the slide frame to re-ink the glass slide.

On the journal of the feed roll $B^1$ is keyed a drum $B^2$ (see Figs. 1, 2 and 3) which is held against back movement by any suitable back ratcheting device as, for example, the spring controlled back ratchet and wheel $B^3$ of familiar form. Upon said drum is wound several times a cord $B^4$, the ends of which are passed down about pulleys $B^5$, $B^6$ rotatably supported at the bottom of the frame A near its front wall, and then secured together and looped about a pulley $B^7$, rotatably mounted on the frame. The pulleys $B^5$, $B^6$ and $B^7$ are so arranged that the horizontal sections of the cord $B^4$ passing about them are substantially parallel to the plane of the guide frame of the glass slide and a short distance below said frame. A ring $B^8$ is secured to the rear horizontal section of the cord $B^4$ and a finger hole $B^9$ is cut in the end of the slide frame $C^1$. It is apparent from Fig. 2 that, by placing one finger of the left hand in the hole $B^9$, and another in the ring $B^8$, the movement of the hand to the left to withdraw the slide frame and re-ink the glass slide will cause a rotation of the feed roll $B^1$ to feed the paper from the roll $A^3$.

In order to clean the stylus D, I provide at the outer end of the glass slide $C^2$ a vertically arranged brush O which will be brought into wiping contact with the end of the stylus when the slide frame is withdrawn to re-ink the glass slide.

By reason of the ball and socket connection between the primary and secondary arms of the sending pen D and also the pivotal connection of the pen to the carrying arm immediately connected to it, said pen is capable of perfectly free movement in any direction so as to eliminate any possibility of a cramped feeling in the hand of the operator. This makes it possible for the operator to manipulate the sending pen in the same way that he would a pen or pencil in ordinary writing. If desired, a construction and arrangement for the carrying arms of the sending pen could be made like that illustrated in connection with the receiving pen but in such case the only facility of movement would lie in the ability to raise the pen from the platen when beginning at a new point or starting a new word.

In Fig. 1 there is indicated at P, by dotted lines, the position of a stereopticon, which shows the relative locations of the stereoptigraph and the stereopticon when in use. The guide frame, including the upper and lower bars C, C, is pushed into the usual slideway provided for the stereopticon plates. It is apparent that the glass slide may be readily re-inked without disturbing the relation of the stereoptigraph and stereopticon.

While, in the embodiment of my invention shown herein, the secondary carrying arms of the sending pen are operatively connected to the secondary arms of the receiving pen by mechanical means and while that is an important feature of my invention, at the same time, it will be understood that said secondary arms may be connected in other ways. It is also apparent that my improvements may be modified in various ways without departing from the spirit of my invention and I do not wish to be limited to any of the details of construction and arrangement shown and described except as pointed out in the appended claims.

The terms "sending pen" and "receiving pen"; "sending platen" and "receiving platen", as employed hereinafter in the claims, are to be taken in their broadest sense and not to be understood as limited in any way except where such limitation is specifically mentioned. For example, I mean the term pen to include a pen, pencil, stylus or anything which may be used for writing, drawing or tracing.

I claim as my invention:—

1. In combination, a sending platen, a sending pen adapted to write or trace thereon, a pair of carrying arms connected to said sending pen, said carrying arms having pivotal connection with each other, a pair of secondary carrying arms each pivotally connected to one of said primary carrying arms, pulleys located in planes parallel to said sending platen, one pulley for each secondary arm, rigidly connected to said secondary arms, a receiving platen, a receiving pen adapted to write or trace thereon, a second pair of primary carrying arms connected to said receiving pen, said second pair of primary carrying arms being pivotally connected together, a second pair of secondary arms each pivotally connected to one of said last named primary arms, pulleys, one for each of said last-named secondary arms, located in planes parallel to said receiving platen, rigidly secured to said second pair of secondary arms, each pulley of the first pair being equal in diameter to the corresponding pulley of the second set, and belts connecting corresponding pulleys.

2. A stereoptigraph embracing a main frame, a sending platen supported thereon, a sending pen adapted to write on said sending platen, a guide frame projecting from the main frame of said stereoptigraph, a slide movably mounted in said guide frame, a receiving pen adapted to trace on said slide, means intermediate said receiving pen and said sending pen adapted to reproduce on the slide pen or pencil effects produced or traced on the sending platen by the sending pen, and means located in the path of movement of said slide for inking the same.

3. A stereoptigraph embracing a main frame, a sending platen supported thereon, a sending pen adapted to write on said sending platen, a guide frame projecting from the main frame of said stereoptigraph, a slide frame movably mounted in said guide frame, a plate secured to said slide frame, a receiving pen adapted to trace on said plate, means intermediate said receiving pen and said sending pen adapted to reproduce on the plate pen or pencil effects produced or traced on the sending platen by the sending pen, an inking roll located in the path of movement of said slide frame, a disk rotatably mounted on said slide frame, and means carried by said guide frame adapted to rotate said disk upon the movement of said slide frame.

4. A stereoptigraph embracing a main frame, a sending platen supported thereon, feed rolls for feeding a strip of paper over said platen, a sending pen adapted to write on said sending platen, a guide frame projecting from the main frame of said stereoptigraph, a slide frame movably mounted in said guide frame, a plate carried by said slide frame, a receiving pen adapted to trace on said plate, means intermediate said receiving pen and said sending pen adapted to reproduce on the plate pen or pencil effects produced or traced on the sending platen by the sending pen, an ink roll located in the path of said slide frame, and means for moving the slide to ink it and for operating the feed rolls by the same movement.

5. In combination with a sending platen, a receiving platen, a receiving pen, and means including an electro-magnet for raising said receiving pen from said receiving platen, a sending pen movable to and from its platen comprising an elongated hollow holder, laterally separated conductor bars located in said holder and projecting from the lower end thereof, a pencil of lead or the like located in said holder and projecting from the lower end thereof, a pencil feeding member movable in said holder, brushes carried by said pencil feeding member in contact with said laterally separated conductor bars, a contact adapted to engage one of said brushes, a movable pencil support for the upper end of said pencil electrically connected with said other brush, and flexibly connected with said pencil feeding member, said pencil support being electrically connected with said contact and being movable therewith, said pencil feeding member being adjustable in said holder, and electrical connections between said magnet and said conductor bars.

6. In combination with a sending platen, a receiving platen, a receiving pen, and means including an electro-magnet for raising said receiving pen from said receiving platen, a sending pen movable to and from its platen, comprising an elongated hollow holder having a screw-thread formed on its inner surface, a pencil supporting plug provided with a longitudinal opening rotatably supported in the lower end of said hollow holder, laterally separated conductor bars connected to said pencil supporting plug and extending longitudinally within said hollow holder, a disk rotatably mounted in said holder, having the upper ends of said conductor bars secured to it, a pencil feeding block having screw-threaded engagement with the internal thread of said holder, laterally separated brushes carried by said block having sliding engagement with said conductor bars, a sleeve located within said holder normally separated longitudinally from said block but adapted under pressure to contact therewith, a pencil of lead or the like extending through the opening in said plug with its upper end located in said sleeve, said sleeve being provided with means to limit the upward movement of said pencil, means for electrically connecting said sleeve and one of said brushes, a contact member adapted to contact with the other brush, said contact member being movable with, and electrically connected to, said sleeve, and electrical connections between said magnet and said conductor bars.

7. A stereoptigraph embracing a main frame, a sending platen supported thereon, a sending pen adapted to write on said sending platen, a guide frame projecting from the main frame of said stereoptigraph, a slide frame movably mounted in said guide frame, a transparent plate secured to said slide frame, a receiving pen adapted to trace on said transparent plate, means intermediate said receiving pen and said sending pen adapted to reproduce on the glass slide pen or pencil effects produced or traced on the sending platen by the sending pen, and a brush carried by said slide frame adapted to clean said receiving pen when said slide frame is withdrawn.

In testimony that I claim the foregoing as my invention I affix my signature in the presence of two witnesses, this 27th day of July, A. D. 1910.

GEORGE W. KAUSER.

Witnesses:
T. H. ALFREDS,
GEO. R. WILKINS.

---

Copies of this patent may be obtained for five cents each, by addressing the "Commissioner of Patents, Washington, D. C."